(12) United States Patent
Bernardes et al.

(10) Patent No.: US 9,154,380 B2
(45) Date of Patent: Oct. 6, 2015

(54) RULES BASED FETCHING OF OPERATING PLATFORM STATUS

(75) Inventors: Murillo Fernandes Bernardes, Campinas (BR); Rodrigo Ceron Ferreira de Castro, Campinas (BR); Alex Zanetti de Lima, Americana (BR); Andre Fernandes de Macedo, Campinas (BR); Paulo Ricardo Paz Vital, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 1933 days.

(21) Appl. No.: 12/332,804

(22) Filed: Dec. 11, 2008

(65) Prior Publication Data

US 2010/0153326 A1    Jun. 17, 2010

(51) Int. Cl.
*G06N 5/02* (2006.01)
*H04L 12/24* (2006.01)
*H04L 12/26* (2006.01)

(52) U.S. Cl.
CPC ........ *H04L 41/0893* (2013.01); *H04L 43/0817* (2013.01)

(58) Field of Classification Search
None
See application file for complete search history.

(56) References Cited

U.S. PATENT DOCUMENTS

| 7,669,029 | B1 * | 2/2010 | Mishra et al. | 711/170 |
| 7,970,746 | B2 * | 6/2011 | Seshadri et al. | 707/694 |
| 2007/0271276 | A1 * | 11/2007 | Allen et al. | 707/10 |
| 2009/0067394 | A1 * | 3/2009 | Van Wingerde | 370/338 |

OTHER PUBLICATIONS

Hayes-Roth, Federick, "Rule-Based Systems", Communication of the ACM, Sep. 1985, vol. 28, 921-932.*

* cited by examiner

*Primary Examiner* — Jeffrey A Gaffin
*Assistant Examiner* — Paulinho E Smith
(74) *Attorney, Agent, or Firm* — Steven M. Greenberg, Esq.; CRGO Law

(57) ABSTRACT

Embodiments of the present invention provide a method, system and computer program product for rules based fetching of operating platform state. In an embodiment of the invention, a method for rules based fetching of operating platform state can be provided. The method can include loading a rule specifying a rule handler programmed to fetch state information for a designated operating platform and parsing the rule to identify the rule handler and a corresponding code interpreter for the rule requisite to interpreting the rule handler to fetch the state information. The method further can include directing an interpretation of the rule handler by the identified code interpreter for the rule to fetch the state information. Finally, the method can include encapsulating the state information once fetched in an information object.

19 Claims, 2 Drawing Sheets

RULES BASED FETCHING OF OPERATING PLATFORM STATUS

BACKGROUND OF THE INVENTION

1. Field of the Invention

The present invention relates to the field of computer operating platform administration and more particularly to operating platform state determination.

2. Description of the Related Art

The growth of enterprise computing has provided substantial advances in productivity for industrial and governmental entities in facilitating the use of computing resources to accomplish organizational tasks in an efficient and expeditious manner. However, the growth of enterprise computing also has given rise to an entire industry segment dedicated to the creation and administration of enterprise computing systems. In this regard, the information technology industry at its core provides for the administration and augmentation of enterprise computing systems including an underlying network architecture, nodal computing clients and servers, operating systems residing in the clients and servers, middleware and other applications executing in the operating systems.

Integral to the role of the administration of the enterprise is the determination of the state of an operating platform in the enterprise. Generally, multiple operating platforms can require state determination. To assess the state of an operating platform such as an operating system or host computing device, an administrator must manually request required state information, either through direct interaction with a console or user interface to the operating system, or remotely through a remote interface to the operating system. In either case, multiple different tools can be required to determine sundry albeit important state data such as memory, central processing unit (CPU) type, operating system versioning data, installed software, local configurations, scripts, scripts executed by other scripts, dependencies and the like.

Thus, assembling a complete listing of state data for an operating platform can be a manual and hence tedious process. Further, the degree of expertise requisite for an administrator using the different tools to acquire the state information can be substantial. Even knowing the requisite state data to be acquired can depend solely on the depth of expertise held by an administrator. In any event, as different administrators cycle out of an organization to seek a different role or different employment, much of this expertise can be lost.

BRIEF SUMMARY OF THE INVENTION

Embodiments of the present invention address deficiencies of the art in respect to operating platform state acquisition and provide a novel and non-obvious method, system and computer program product for rules based fetching of operating platform state. In an embodiment of the invention, a method for rules based fetching of operating platform state can be provided. The method can include loading a rule specifying a rule handler programmed to fetch state information for a designated operating platform and parsing the rule to identify the rule handler and a corresponding code interpreter for the rule requisite to interpreting the rule handler to fetch the state information. The method further can include directing an interpretation of the rule handler by the identified code interpreter for the rule to fetch the state information. Finally, the method can include encapsulating the state information once fetched in an information object.

In one aspect of the embodiment, directing an interpretation of the rule handler by the identified code interpreter for the rule to fetch the state information can include additionally parsing the rule to identify a condition pre-requisite to directing the interpretation of the rule handler, and a corresponding code interpreter for the condition requisite to interpreting the condition, evaluating the condition by directing an interpretation of the condition with the corresponding code interpreter for the condition, and directing an interpretation of the rule handler by the identified code interpreter for the rule to fetch the state information only when the condition evaluates favorably. In another aspect of the embodiment, directing an interpretation of the rule handler by the identified code interpreter for the rule to fetch the state information can include directing an interpretation of the rule handler by the identified code interpreter for the rule and also parameters specified in the rule to fetch the state information.

In another embodiment of the invention, an operating platform administration data processing system can be configured for rules based fetching of operating platform state. The system can include an administration console coupled to a different code interpreters and a data store of rules, rule handlers and output handlers. Each of the rules can specify at least one of the rule handlers, and each of the rule handlers can be programmed to fetch state information for a designated operating platform communicatively coupled to the administration console. The system also can include a rules based status fetching module coupled to the administration console. The module can include program code enabled to load and parse a rule amongst the rules to identify a rule handler specified therein and one of the code interpreters requisite to interpreting the specified rule handler to fetch the state information, to direct an interpretation of the specified rule handler by the identified one of the code interpreters, and to encapsulate the state information once fetched in an information object.

In one aspect of the embodiment, each of the rules further can include a condition pre-requisite to directing interpretation of the specified rule handler, and a corresponding code interpreter for the condition requisite to interpreting the condition. In another aspect of the embodiment, an output handler can be configured to present the state information in the information object in a variable format.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for rules based fetching of operating platform state. In accordance with an embodiment of the present invention, one or more rules can be established, each rule specifying a condition upon which state information is to be retrieved from an operating platform and a code interpreter able to process the condition to determine whether or not to process the rule to generate an information containing a directive to retrieve state information for an operating platform. Each rule further can specify a rule handler which when interpreted by a corresponding interpreter can fetch state information for a designated operating platform. The rule handler, when the condition evaluates favorably (e.g. True), can be interpreted with a code interpreter specified by the rule to fetch the state information from the designated operating platform and can generate an information object containing the desired state information.

Object handlers configured to present the state information in variable formats such as a string on standard output, as a markup artifact for transmission to a remote procedure call, as a serialized object, or as a file. In this way, once the rules have been established, operating platform state information can be fetched for different operating platforms without requiring tedious manual directives to retrieve the operating platform state information. Further, in that the rules can be extended or modified at any time to accommodate evolving needs in managing the enterprise, an administrator retrieving the operating platform state information need not maintain a detailed awareness of the nuances of the process requisite to retrieving the operating platform state information.

Figure 1:
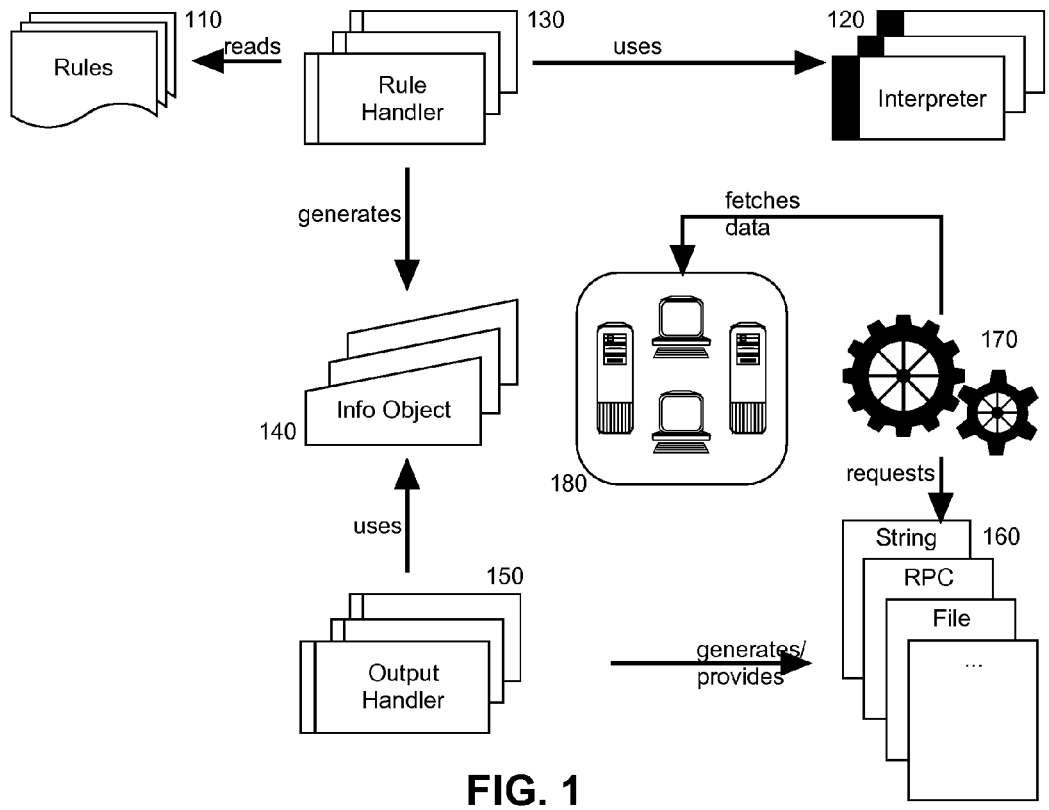
FIG. 1 is a pictorial illustration of a process for rules based fetching of operating platform state.

In further illustration, FIG. 1 is a pictorial illustration of a process for rules based fetching of operating platform state. As shown in FIG. 1, one or more rules 110 can be established for processing by a selected one of one or more rule handlers 130 with the assistance of one or more code interpreters 120 in order to generate corresponding information objects 140 encapsulating state information for a respectively designated operating platform 180. In this regard, once generated, each one of the information objects 140 can be processed by one or more output handlers 150 upon invocation by a requesting process 170 to present the encapsulated state information for the operating platform 180 in a selected format 160.

Specifically, each individual one of the rules 110 can specify a condition upon which the individual one of the rules 110 is to be processed to generate a corresponding one of the information objects 140. Further, each of the individual rules 110 can specify one of the rule handlers 130 to request a particular one of the code interpreters 120 to interpret interpretable code in one of the rule handlers 130. The invocation of one of the rule handlers 130 to process the individual one of the rules 110 can result in the direction of the interpretation of interpretable code of the one of the rule handlers 130 to process the individual one of the rules 110 in order to retrieved desired state information for an operating platform 160 into a corresponding one of the information objects 140. Finally, each individual one of the rules 110 can include fields providing parameters and interpretable code instructions specific to the specified one of the interpreters 120 for use by the one of the rule handlers 130 in generating a corresponding one of the information objects 140.

By way of example, an exemplary one of the rules 110 can be embodied within a markup artifact as follows:

```
<?xml version="1.0">
<cpu>
    <condition interpreter="python">
        import platform
        distro, vers, extra = platform.dists( )
        if distro == "redhat" and vers == 4:
            return True
        else
            return False
    </condition>
    <memory interpreter="bash">
        cat /proc/meminfo | grep MemTotal | awk '{print $2 }'
    </memory>
    <cpu_num interpreter="bash">
        cat /proc/cpuinfo | grep ^processor | wc -l
    </cpu_num>
<cpu>
```

Figure 2:
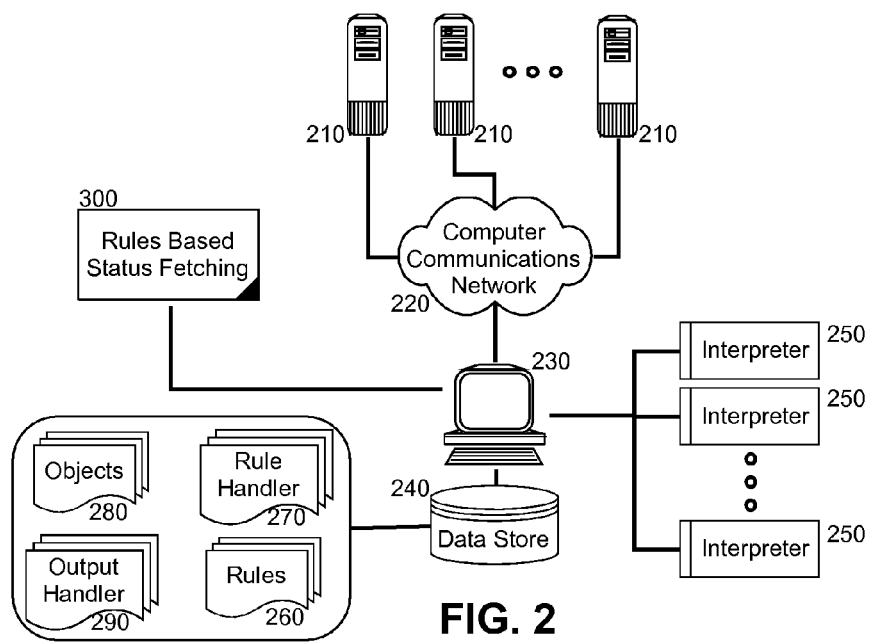
FIG. 2 is a schematic illustration of an operating platform administration data processing system configured for rules based fetching of operating platform state; and, FIG. 3 is a flow chart illustrating a process for rules based fetching of operating platform state.

The process described in connection with FIG. 1 can be embodied within an operating platform administration data processing system. In yet further illustration, FIG. 2 is a schematic illustration of an operating platform administration data processing system configured for rules based fetching of operating platform state. The system can include one or more operating platforms 210 communicatively coupled to an administration console 230 over computer communications network 220. The operating platforms 210 can include one or more servers or other computing devices, each of which can include one or more operating systems executing in the servers or other computing devices and one or more applications hosted by one or more of the operating systems.

The administration console 230 can be coupled to one or more code interpreters 250 and a data store 240 storing established rules 260, rule handlers 270, information objects 280 produced by application of the interpreters 250 by the rule handlers 270 to the rules 260, and output handlers 290 transforming the information objects 280 into a form useful for presentation in the administration console 230 or to another requesting entity. Rules based status fetching module 300 further can be coupled to administration console 230.

The rules based status fetching module 300 can include program code enabled to parse individual ones of the rules 260 to identify a particular one of the interpreters 250 to interpret a condition in the individual one of the rules 260. The program code further can be enabled, responsive to a favorable evaluation of the condition, to identify a particular one of the rule handlers 270 and another one of the interpreters 250 to interpret interpretable logic in the particular one of the rule handlers 270 and the individual one of the rules 260 to programmatically fetch state information for a specified one of the operating platforms 210 and to encapsulate the fetched state in one of the information objects 280.

Figure 3:
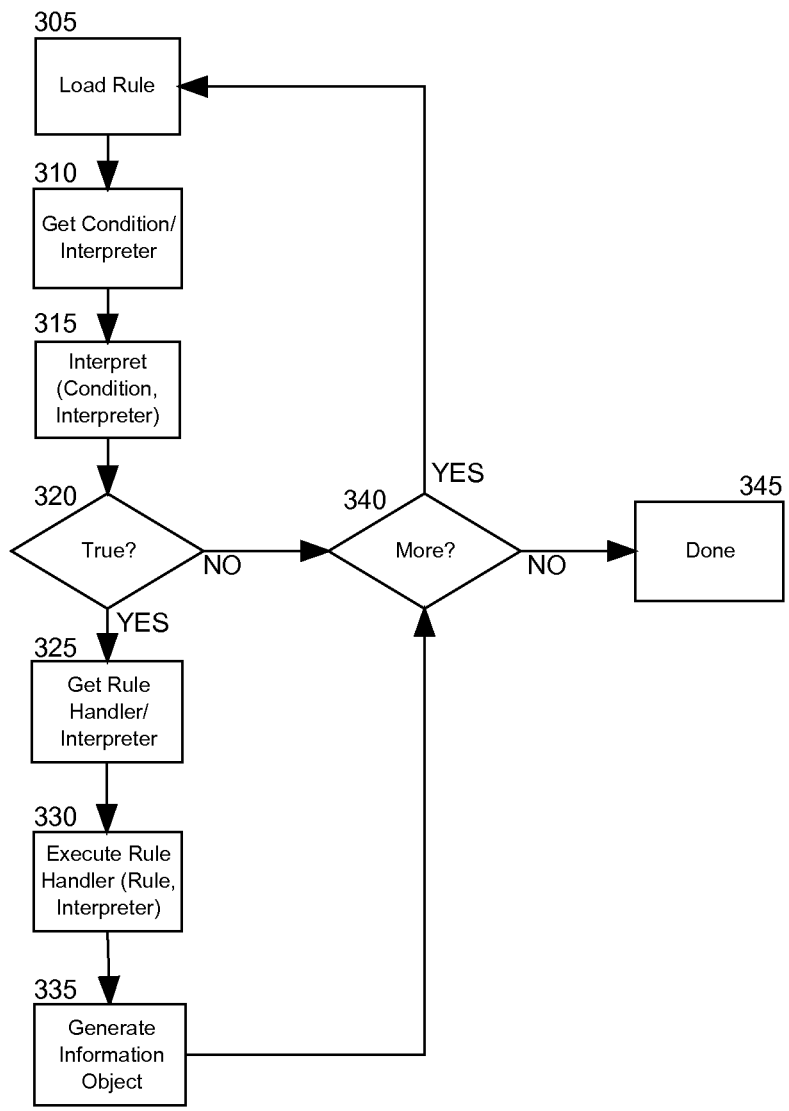

In even yet further illustration of the operation of the rules based status fetching module 300, FIG. 3 is a flow chart illustrating a process for rules based fetching of operating platform state. Beginning in block 305 of FIG. 3A, a rule can be loaded for parsing and in block 310 a condition and corresponding code interpreter can be identified. In this regard, the code interpreter can include any interpreter configured to interpret code conforming to a specified syntax, such as a BASIC interpreter, Python interpreter, Java interpreter and the like. In block 315 the condition can be interpreted with the code interpreter to evaluate the condition. In decision block 320, if the condition evaluates favorably, in block 325 a rule handler can be identified for the rule as can a code interpreter for interpreting the rule handler and parameters specified in the rule for a specified operating platform or portion thereof, for example an operating system version, hardware characteristic, executing application, and the like.

Thereafter, in block 330 the rule handler can be interpreted along with the parameters in the rule using the identified code interpreter in order to fetch state information for a specified operating platform. Consequently, in block 335 an information object can be generated to encapsulate the fetched state information. In decision block 340, if additional rules remain to be processed, the process can repeat in block 305. Otherwise, the process can end in block 345. Optionally, once one or more information objects have been generated, each encapsulating state information for a corresponding operating platform, an output handler can present the state information in varying selectable formats, such as in the form of a string on standard output, a markup artifact transmittable to a remote calling procedure, as a serialized object, a binary or a text file, and so forth.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for rules based fetching of operating platform state, the method comprising:

loading a rule specifying a rule handler programmed to fetch state information for a designated operating platform;

parsing the rule to identify the rule handler and a corresponding code interpreter for the rule requisite to interpreting the rule handler to fetch the state information;

directing an interpretation of the rule handler by the identified code interpreter for the rule to fetch the state information; and, encapsulating the state information once fetched in an information object.

2. The method of claim 1, wherein directing an interpretation of the rule handler by the identified code interpreter for the rule to fetch the state information, comprises:

additionally parsing the rule to identify a condition pre-requisite to directing the interpretation of the rule handler, and a corresponding code interpreter for the condition requisite to interpreting the condition;

evaluating the condition by directing an interpretation of the condition with the corresponding code interpreter for the condition; and, directing an interpretation of the rule handler by the identified code interpreter for the rule to fetch the state information only when the condition evaluates favorably.

3. The method of claim 1, wherein directing an interpretation of the rule handler by the identified code interpreter for the rule to fetch the state information, comprises directing an interpretation of the rule handler by the identified code interpreter for the rule and also parameters specified in the rule to fetch the state information.

4. The method of claim 1, further comprising invoking an object handler to present the state information in the information object in a selected one of a variable format.

5. The method of claim 1, further comprising invoking an object handler to present the state information in the information object in a string on standard output.

6. The method of claim 1, further comprising invoking an object handler to present the state information in the information object in a markup artifact for transmission to a remote procedure call.

7. The method of claim 1, further comprising invoking an object handler to present the state information in the information object in a serialized object.

8. The method of claim 1, further comprising invoking an object handler to present the state information in the information object in a file.

9. An operating platform administration data processing system configured for rules based fetching of operating platform state, the system comprising:

an administration console coupled to a plurality of code interpreters and a data store of rules, rule handlers and output handlers, each of the rules specifying at least one of the rule handlers, each of the rule handlers being programmed to fetch state information for a designated operating platform communicatively coupled to the administration console, the console executing in memory of a computer system; and, a rules based status fetching module coupled to the administration console, the module comprising program code enabled upon execution in the memory of the computer system to load and parse a rule amongst the rules to identify a rule handler specified therein and one of the code interpreters requisite to interpreting the specified rule handler to fetch the state information, to direct an interpretation of the specified rule handler by the identified one of the code interpreters, and to encapsulate the state information once fetched in an information object.

10. The system of claim 9, wherein each of the rules further comprises a condition pre-requisite to directing interpretation of the specified rule handler, and a corresponding code interpreter for the condition requisite to interpreting the condition.

11. The system of claim 9, further comprising an output handler configured to present the state information in the information object in a variable format.

12. A non-transitory computer program product comprising a computer usable storage medium storing embodying computer usable program code for rules based fetching of operating platform state, the non-transitory computer program product comprising:
   computer usable program code for loading a rule specifying a rule handler programmed to fetch state information for a designated operating platform;
   computer usable program code for parsing the rule to identify the rule handler and a corresponding code interpreter for the rule requisite to interpreting the rule handler to fetch the state information;
   computer usable program code for directing an interpretation of the rule handler by the identified code interpreter for the rule to fetch the state information; and
   computer usable program code for encapsulating the state information once fetched in an information object.

13. The computer program product of claim 12, wherein the computer usable program code for directing an interpretation of the rule handler by the identified code interpreter for the rule to fetch the state information, comprises:
   computer usable program code for additionally parsing the rule to identify a condition pre-requisite to directing the interpretation of the rule handler, and a corresponding code interpreter for the condition requisite to interpreting the condition;
   computer usable program code for evaluating the condition by directing an interpretation of the condition with the corresponding code interpreter for the condition; and,
   computer usable program code for directing an interpretation of the rule handler by the identified code interpreter for the rule to fetch the state information only when the condition evaluates favorably.

14. The computer program product of claim 12, wherein the computer usable program code for directing an interpretation of the rule handler by the identified code interpreter for the rule to fetch the state information, comprises computer usable program code for directing an interpretation of the rule handler by the identified code interpreter for the rule and also parameters specified in the rule to fetch the state information.

15. The computer program product of claim 12, further comprising computer usable program code for invoking an object handler to present the state information in the information object in a selected one of a variable format.

16. The computer program product of claim 12, further comprising computer usable program code for invoking an object handler to present the state information in the information object in a string on standard output.

17. The computer program product of claim 12, further comprising computer usable program code for invoking an object handler to present the state information in the information object in a markup artifact for transmission to a remote procedure call.

18. The computer program product of claim 12, further comprising computer usable program code for invoking an object handler to present the state information in the information object in a serialized object.

19. The computer program product of claim 12, further comprising computer usable program code for invoking an object handler to present the state information in the information object in a file.

* * * * *